M. K. &. L. P. LEWIS.
Apparatus for Holding Sheep while being Sheared.
No. 49,636. Patented Aug. 29, 1865.
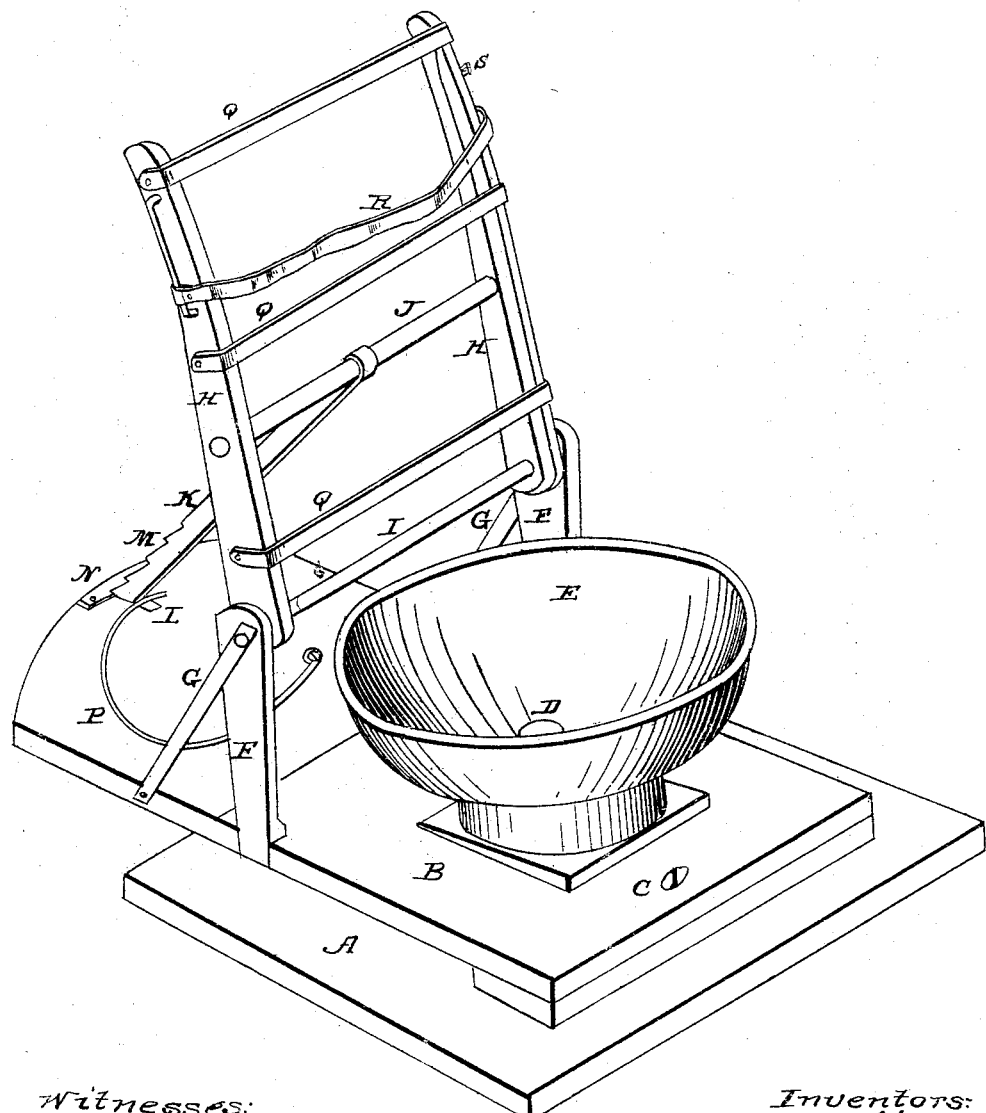

United States Patent Office.

MILES K. LEWIS AND LYMAN P. LEWIS, OF IOWA CITY, IOWA.

IMPROVEMENT IN DEVICES FOR HOLDING SHEEP WHILE BEING SHEARED.

Specification forming part of Letters Patent No. 49,636, dated August 29, 1865.

*To all whom it may concern:*

Be it known that we, MILES K. LEWIS and LYMAN P. LEWIS, both of Iowa City, in the county of Johnson and State of Iowa, have invented a new and useful Stool or Machine for Holding Sheep while They are being Sheared; and we do hereby declare that the same is described and represented in the following specification and drawing.

To enable others skilled in the art to make and use our invention, we will proceed to describe its construction and operation, referring to the drawing.

Our invention for holding sheep while they are sheared consists in a revolving seat, made concave or otherwise, for the purpose of holding and turning sheep while they are being shorn of their wool, and in combining with the above-mentioned seat a back or rack, (to support the sheep on its seat,) made arched, curved, or otherwise, and provided with a device for adjusting said back more or less inclined or otherwise; also, in mounting said seat and back on a rotating platform, so that it may be turned by the shearer to adapt it to the air, light, or other circumstances.

In the accompanying drawing, the floor is represented at A, over which floor the platform B is arranged to turn on the pivot or screw C, so that the shearer can turn the platform and machine and adapt his operations to the air, light, and other surroundings.

On the platform B and near the screw C the pivot D is fastened, upon which pivot the seat E turns freely. This seat E may be made concave of a convenient size to hold the rump of a sheep, or in such other form as will answer the purpose. It may be of wood or other material, as may be preferred.

The standards F F are fastened to the platform B and supported by the braces G G. To the upper ends of these standards the curved bars H H are hinged by the rod I, so as to vibrate freely. The bars H H are connected by the bar J, which has the adjusting-brace K hinged to it, as shown in the drawing. This brace works in the score L in the platform B, and is provided with a series of notches, M, which catch against the bar N, fastened to the platform, and adjust the bars H H more or less inclined, as desired.

The spring P is fastened to the platform to press the brace K against the bar N. The straps Q Q, of leather or other material, are fastened across the bars H to form a rack or back to support the sheep in a convenient position on the seat E.

The strap R is arranged to traverse on a long staple in one of the bars H, and may be put across the neck or breast of the sheep and hitched onto one of the screws S in the other bar H to hold the sheep against the rack.

The use of our machine renders the process of shearing far less trying to the sheep and far less laborious to the shearer, and it will also enable him to do more work in a given time and to do it better.

Having described our invention, we claim—

1. A revolving seat, made concave or otherwise, for the purpose of holding and turning sheep while they are being shorn of their wool.

2. In combination with the above-claimed seat, a back or rack, made arched, curved, or otherwise, to support the sheep on its rump, and provided with a device to hold said rack more or less inclined or otherwise.

3. Mounting said seat and rack on a rotating platform, so that it may be turned by the shearer to adapt it to the air, light, or other circumstances.

MILES K. LEWIS.
LYMAN P. LEWIS.

Witnesses:
L. ROBINSON,
CAREY R. SMITH.